US012769806B2

(12) United States Patent
Burr et al.

(10) Patent No.: US 12,769,806 B2
(45) Date of Patent: Oct. 20, 2026

(54) HARDWARE FOR PARALLEL LAYER-NORM COMPUTE

(71) Applicant: International Business Machines Corporation, Armonk, NY (US)

(72) Inventors: Geoffrey Burr, Ossining, NY (US); Shubham Jain, Elmsford, NY (US); Yasuteru Kohda, Yamato (JP); Milos Stanisavljevic, Langnau am Albis (CH)

(73) Assignee: International Business Machines Corporation, Armonk, NY (US)

( * ) Notice: Subject to any disclaimer, the term of this patent is extended or adjusted under 35 U.S.C. 154(b) by 913 days.

(21) Appl. No.: 18/083,011

(22) Filed: Dec. 16, 2022

(65) Prior Publication Data

US 2024/0211532 A1 Jun. 27, 2024

(51) Int. Cl.
*G06F 17/16* (2006.01)
*G06N 3/063* (2023.01)

(52) U.S. Cl.
CPC ............. *G06F 17/16* (2013.01); *G06N 3/063* (2013.01)

(58) Field of Classification Search
CPC ................................ G06F 17/16; G06N 3/063
See application file for complete search history.

(56) References Cited

U.S. PATENT DOCUMENTS

2017/0103315 A1 4/2017 Thorson et al.
2020/0218964 A1 7/2020 Nakahara
2021/0042260 A1 2/2021 Reinhardt et al.
2021/0157550 A1 5/2021 Wang et al.
2021/0312266 A1 10/2021 Youn et al.
2022/0245083 A1 8/2022 Youn et al.
(Continued)

FOREIGN PATENT DOCUMENTS

CN 111144556 A 5/2020
CN 114118343 A 3/2022
WO 2024/125279 A2 6/2024

OTHER PUBLICATIONS

Lu, Siyuan et al., "Hardware accelerator for multi-head attention and position-wise feed-forward in the transformer." 2020 IEEE 33rd International System-on-Chip Conference (SOCC), pp. 84-89. IEEE, 2020, https://arxiv.org/pdf/2009.08605.pdf, 6 pages.
(Continued)

*Primary Examiner* — Michael D. Yaary
(74) *Attorney, Agent, or Firm* — Scully, Scott, Murphy & Presser, P.C.; Kimberly Zillig

(57) ABSTRACT

Systems and methods for performing layer normalization are described. A circuit can receive a sequence of input data across a plurality of clock cycles, where the sequence of input data represents a portion of an input vector. The circuit can determine a plurality of sums and a plurality of sums of squares corresponding to the sequence of input data. The circuit can determine, based on the plurality of sums of squares, a first scalar representing an inverse square-root of a variance of vector elements in the input vector. The circuit can determine a second scalar representing a negation of a product of the first scalar and a mean of the vector elements in the input vector. The circuit can determine, based on the first scalar, the second scalar and the received sequence of input data, an output vector that is a normalization of the input vector.

20 Claims, 11 Drawing Sheets

(56) References Cited

U.S. PATENT DOCUMENTS

| | | | | |
|---|---|---|---|---|
| 2024/0028655 | A1* | 1/2024 | Adams | G06F 16/285 |
| 2024/0086192 | A1 | 3/2024 | Burr et al. | |
| 2024/0154618 | A1* | 5/2024 | Yoon | G06N 3/08 |
| 2024/0211532 | A1 | 6/2024 | Burr et al. | |
| 2024/0220572 | A1 | 7/2024 | Jain et al. | |
| 2024/0361797 | A1 | 10/2024 | Burr et al. | |
| 2024/0403045 | A1 | 12/2024 | Burr et al. | |

OTHER PUBLICATIONS

International Search Report And Written Opinion dated Feb. 20, 2024 received in PCT Patent Application No. PCT/CN2023/134249.

* cited by examiner $$T = \sum_{k=1}^{N} x_k$$

$$\mu = \frac{1}{N}\sum_{k=1}^{N} x_k$$

$$S = \sum_{k=1}^{N} x_k^2$$

$$V = \frac{1}{N}\sum_{k=1}^{N} x_k^2$$

$$\sigma^2 = -(\mu * \mu) + \frac{1}{N}\sum_{k=1}^{N} x_k^2$$

$$C = \frac{1}{\sqrt{\sigma^2 + \epsilon}}$$

$$D = \frac{-\mu}{\sqrt{\sigma^2 + \epsilon}}$$

HARDWARE FOR PARALLEL LAYER-NORM COMPUTE

BACKGROUND

The present application relates generally to analog memory-based artificial neural networks and more particularly to techniques that compute layer normalization to normalize the distributions of intermediate layers in analog memory-based artificial neural networks.

Artificial neural networks (ANNs) can include a plurality of node layers, such as an input layer, one or more hidden layers, and an output layer. Each node can connect to another node, and has an associated weight and threshold. If the output of any individual node is above the specified threshold value, that node is activated, sending data to the next layer of the network. Otherwise, no data is passed along to the next layer of the network. ANNs can rely on training data to learn and improve their accuracy over time. Once an ANN is fine-tuned for accuracy, it can be used for classifying and clustering data.

Analog memory-based neural network may utilize, by way of example, storage capability and physical properties of memory devices to implement an artificial neural network. This type of in-memory computing hardware increases speed and energy efficiency, providing potential performance improvements. Rather than moving data from memory devices to a processor to perform a computation, analog neural network chips can perform computation in the same place (e.g., in the analog memory) where the data is stored. Because there is no movement of data, tasks can be performed faster and require less energy.

BRIEF SUMMARY

The summary of the disclosure is given to aid understanding of a system and method of special-purpose digital-compute hardware for reduced-precision layer-norm compute in analog memory-based artificial neural networks, which can provide efficiency, and not with an intent to limit the disclosure or the invention. It should be understood that various aspects and features of the disclosure may advantageously be used separately in some instances, or in combination with other aspects and features of the disclosure in other instances. Accordingly, variations and modifications may be made to the system and/or their method of operation to achieve different effects.

In one embodiment, an integrated circuit for performing layer normalization is generally described. The integrated circuit can include a plurality of circuit blocks and a digital circuit. Each circuit block among the plurality of circuit blocks can be configured to receive a sequence of input data across a plurality of clock cycles. The sequence of input data can represent a portion of an input vector, and each input data among the sequence includes data elements can represent a subset of vector elements in the portion of the input vector. Each circuit block among the plurality of circuit blocks can be further configured to determine a plurality of sums corresponding to the sequence of input data. Each sum among the plurality of sums can be a sum of the subset of vector elements in corresponding input data. Each circuit block among the plurality of circuit blocks can be further configured to determine a plurality of sums of squares corresponding to the sequence of input data. Each sum of squares among the plurality of sums of squares can be a sum of squares of the subset of vector elements in corresponding input data. Each circuit block among the plurality of circuit blocks can be further configured to output the plurality of sums and the plurality of sums of squares to the digital circuit. The digital circuit can be configured to determine, based on the plurality of sums, a mean of the vector elements in the input vector. The digital circuit can be further configured to determine, based on the plurality of sums of squares, a first scalar representing an inverse square-root of a variance of the vector elements in the input vector. The digital circuit can be further configured to determine, based on the plurality of sums of squares, a second scalar representing a negation of a product of the first scalar and a mean an inverse square-root of a variance of the vector elements in the input vector. The digital circuit can be further configured to output the first scalar and the second scalar to the plurality of circuit blocks. Each circuit block among the plurality of circuit blocks can be further configured to determine, based on the first scalar, the second scalar and the received sequence of input data, vector elements of an output vector. The output vector can be a normalization of the input vector.

Advantageously, the integrated circuit in an aspect can utilize parallel processing to perform layer normalization in order to reduce latency and improve throughput of the layer normalization operation in artificial neural network applications.

In one embodiment, a system for performing layer normalization is generally described. The system can include a first crossbar array of memory elements, a second crossbar array of memory elements, an integrated circuit including a plurality of circuit blocks and a digital circuit. Each circuit block among the plurality of circuit blocks can be configured to receive a sequence of input data, across a plurality of clock cycles, from the first crossbar array of memory elements. The sequence of input data can represent a portion of an input vector, and each input data among the sequence can include data elements representing a subset of vector elements in the portion of the input vector. Each circuit block among the plurality of circuit blocks can be configured to determine a plurality of sums corresponding to the sequence of input data. Each sum among the plurality of sums can be a sum of the subset of vector elements in corresponding input data. Each circuit block among the plurality of circuit blocks can be configured to determine a plurality of sums of squares corresponding to the sequence of input data. Each sum of squares among the plurality of sums of squares can be a sum of squares of the subset of vector elements in corresponding input data. Each circuit block among the plurality of circuit blocks can be configured to output the plurality of sums and the plurality of sums of squares to the digital circuit. The digital circuit can be configured to determine, based on the plurality of sums, a mean of the vector elements in the input vector. The digital circuit can be further configured to determine, based on the plurality of sums of squares, a first scalar representing an inverse square-root of a variance of the vector elements in the input vector. The digital circuit can be further configured to determine, based on the plurality of sums of squares, a second scalar representing a negation of a product of the first scalar and a mean an inverse square-root of a variance of the vector elements in the input vector. The digital circuit can be further configured to output the first scalar and the second scalar to the plurality of circuit blocks. Each circuit block among the plurality of circuit blocks can be further configured to determine, based on the first scalar, the second scalar and the received sequence of input data, vector elements of an output vector. The output vector can be a normalization of the input vector. Each circuit block among the plurality of circuit blocks can be further configured to output the output vector to the second crossbar array of memory elements.

Advantageously, the system in an aspect can utilize parallel processing to perform layer normalization in order to reduce latency and improve throughput of the layer normalization operation in artificial neural network applications.

In one embodiment, a method for performing layer normalization is generally described. The method can include receiving a sequence of input data, across a plurality of clock cycles, from a first crossbar array of memory elements. The sequence of input data can represent a portion of an input vector, and each input data among the sequence can include data elements representing a subset of vector elements in the portion of the input vector. The method can further include determining a plurality of sums corresponding to the sequence of input data. Each sum among the plurality of sums can be a sum of the subset of vector elements in corresponding input data. The method can further include determining a plurality of sums of squares corresponding to the sequence of input data. Each sum of squares among the plurality of sums of squares can be a sum of squares of the subset of vector elements in corresponding input data. The method can further include determining, based on the plurality of sums, a mean of the vector elements in the input vector. The method can further include determining, based on the plurality of sums of squares, a first scalar representing an inverse square-root of a variance of the vector elements in the input vector. The method can further include determining, based on the plurality of sums of squares, a second scalar representing a negation of a product of the first scalar and the mean of the input vector. The method can further include determining, based on the first scalar, the second scalar and the received sequence of input data, vector elements of an output vector. The output vector can be a normalization of the input vector. The method can further include outputting the output vector to a second crossbar array of memory elements.

Advantageously, the method in an aspect can utilize parallel processing to perform layer normalization in order to reduce latency and improve throughput of the layer normalization operation in artificial neural network applications.

Further features as well as the structure and operation of various embodiments are described in detail below with reference to the accompanying drawings. In the drawings, like reference numbers indicate identical or functionally similar elements.

DETAILED DESCRIPTION

Deep neural networks (DNNs) can be ANNs that includes relatively large number of hidden layers or intermediate layers between the input layer and the output layer. Due to the large number of intermediate layers, training DNNs can involve relatively large amounts of parameters. Layer normalization ("LayerNorm") is a technique for normalizing distributions of intermediate layers in a deep neural network (DNN). In an aspect, layer normalization can be an operation being performed in a transformer (e.g., neural network that transforms a sequence into another sequence) of a DNN. Layer normalization can enable smoother gradients, faster training, and better generalization accuracy.

Layer normalization can normalize output vectors from a particular DNN layer across the vector-elements using the mean and standard-deviation of the vector-elements. Since the length of the vector to be normalized can be relatively large (e.g., 256 to 1024 elements, or more), it is desirable to provide rapid end-to-end latency and high throughput on the layer normalization operation. Large latency can delay processing in subsequent layers, and throughput can be constrained by limitations imposed by layer normalization.

Some conventional solutions to perform layer normalization for large vectors can involve microprocessor or multiprocessors utilizing memory space and instruction set architecture. However, such utilization of memory devices can be relatively less energy-efficient. To provide rapid end-to-end latency and high throughput on the layer normalization operation, the systems and methods described herein can provide a special-purpose compute hardware that can efficiently compute the mean and standard deviation across a relatively large vector, and can exchange of intermediate sum information for handling even larger vectors. The computed mean and standard deviation can be used in layer normalization operations with reasonable throughput and energy efficiency.

Figure 1:
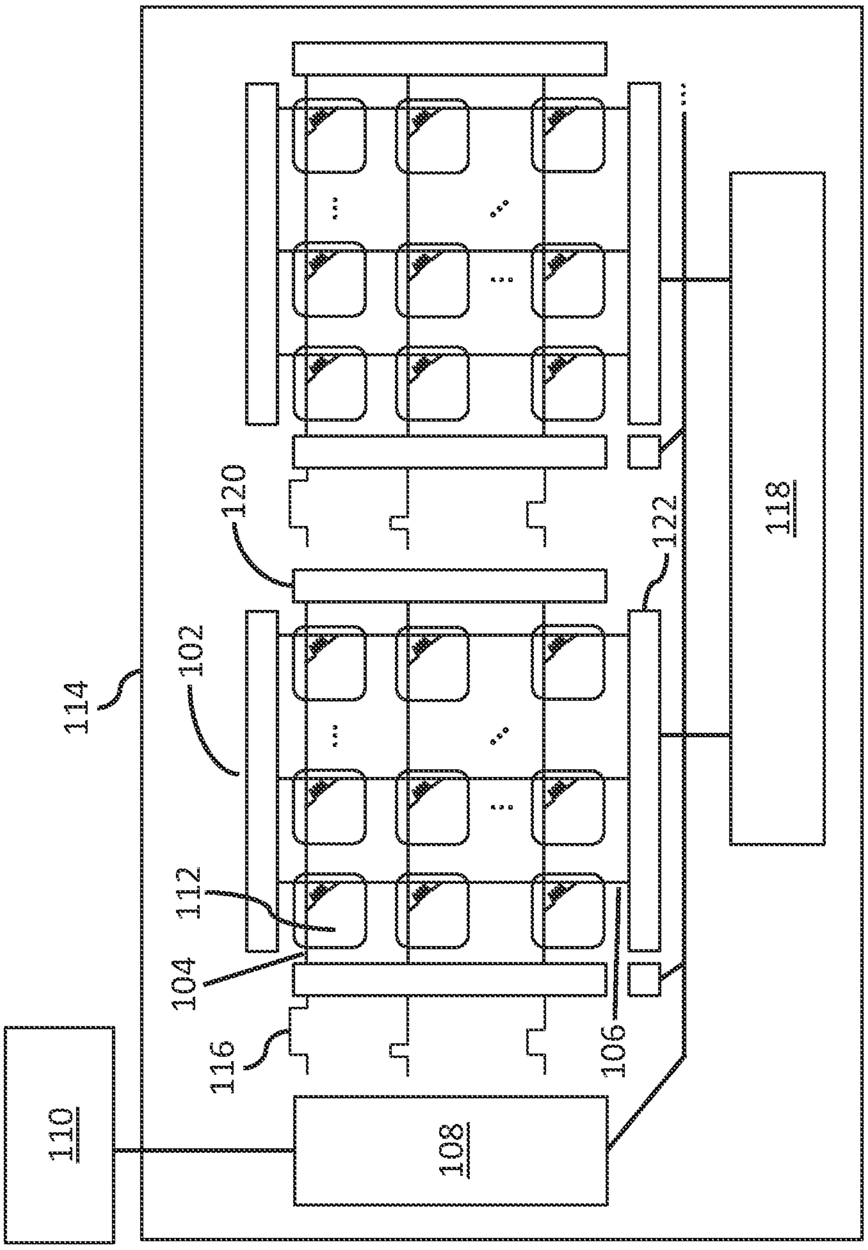
FIG. 1 is a diagram illustrating analog memory-based devices implementing a hardware neural network in an embodiment.

FIG. 1 is a diagram illustrating analog memory-based devices implementing a hardware neural network in an embodiment. An analog memory-based device 114 ("device 114") is shown in FIG. 1. Device 114 can be a co-processor or an accelerator, and device 114 can sometimes be referred to as an analog fabric (AF) engine. One or more digital processors 110 can communicate with device 114 to facilitate operations or functions of device 114. In one embodiment, digital processor 110 can be a field programmable gate array (FPGA) board. Device 114 can also be interfaced to components, such as digital-to-analog converters (DACs), that can provide power, voltage and current to device 114. Digital processor 110 can implement digital logic to interface with device 114 and other components such as the DACs.

In an embodiment, device 114 can include a plurality of multiply accumulate (MAC) hardware having a crossbar structure or array. There can be multiple crossbar structure or arrays, which can be arranged as a plurality of tiles, such as a tile 102. While FIG. 1 shows two MAC hardware (two tiles), there can be additional (e.g., more than two) MAC tiles integrated in device 114. By way of example, tile 102 can include electronic devices such as a plurality of memory elements 112. Memory elements 112 can be arranged at cross points of the crossbar array. At each cross point or junction of the crossbar structure or crossbar array, there can be at least one memory element 112 including an analog memory element such as resistive RAM (ReRAM), conductive-bridging RAM (CBRAM), NOR flash, magnetic RAM (MRAM), and phase-change memory (PCM). In an embodiment, such analog memory element can be programmed to store synaptic weights of an artificial neural network (ANN).

In an aspect, each tile 102 can represent a layer of an ANN. Each memory element 112 can be connected to a respective one of a plurality of input lines 104 and to a respective one of a plurality of output lines 106. Memory elements 112 can be arranged in an array with a constant distance between crossing points in a horizontal and vertical dimension on the surface of a substrate. Each tile 102 can perform vector-matrix multiplication. By way of example, tile 102 can include peripheral circuitry such as pulse width modulators at 120 and peripheral circuitry such as readout circuits 122.

Electrical pulses 116 or voltage signals can be input (or applied) to input lines 104 of tile 102. Output currents can be obtained from output lines 106 of the crossbar structure, for example, according to a multiply-accumulate (MAC) operation, based on the input pulses or voltage signals 116 applied to input lines 104 and the values (synaptic weights) stored in memory elements 112.

Tile 102 can include n input lines 104 and m output lines 106. A controller 108 (e.g., global controller) can program memory elements 112 to store synaptic weights values of an ANN, for example, to have electrical conductance (or resistance) representative of such values. Controller 108 can include (or can be connected to) a signal generator (not shown) to couple input signals (e.g., to apply pulse durations or voltage biases) into the input lines 104 or directly into the outputs.

In an embodiment, readout circuits 122 can be connected or coupled to read out the m output signals (electrical currents) obtained from the m output lines 106. Readout circuits 122 can be implemented by a plurality of analog-to-digital converters (ADCs). Readout circuit 122 may read currents as directly outputted from the crossbar array, which can be fed to another hardware or circuit 118 that can process the currents, such as performing compensations or determining errors.

Processor 110 can be configured to input (e.g., via the controller 108) a set of input activation vectors into the crossbar array. In one embodiment, the set of input activation vectors, which is input into tile 102, is encoded as electrical pulse durations. In another embodiment, the set of input activation vectors, which is input into tile 102, can be encoded as voltage signals. Processor 110 can also be configured to read, via controller 108, output activation vectors from the plurality of output lines 106 of tile 102. The output activation vectors can represent outputs of operations (e.g., MAC operations) performed on the crossbar array based on the set of input activation vectors and the synaptic weight stored in memory elements 112. In an aspect, the input activation vectors get multiplied by the value (e.g., synaptic weight) stored on memory elements 112 of tile 102, and the resulting products are accumulated (added) column-wise to produce output activation vectors in each one of those columns (output lines 106).

Figure 2:
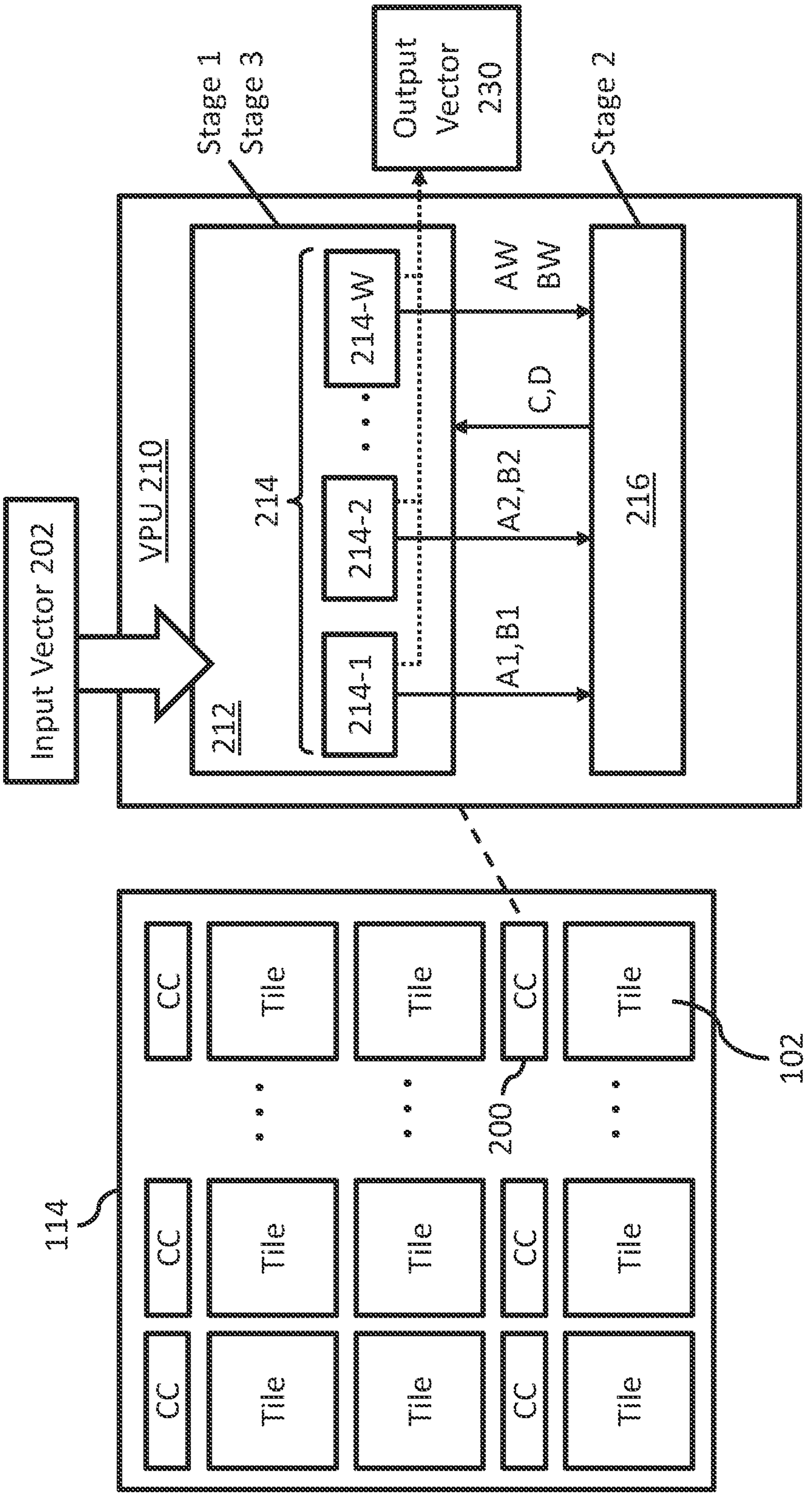
FIG. 2 is a diagram illustrating details of an analog memory-based device that can implement special-purpose digital-compute hardware for parallel layer-norm compute in one embodiment.

FIG. 2 is a diagram illustrating details of an analog memory-based device that can implement special-purpose digital-compute hardware for efficient parallel layer-norm compute in one embodiment. In an embodiment shown in FIG. 2, device 114 can further include a plurality of compute-cores (CC) 200. Computer-cores 200 can be inserted between tiles 102 and can be configured to perform auxiliary operations that are not readily performed on analog crossbar structures (e.g., array of memory elements 112 in FIG. 1). Some examples of auxiliary operations can include, but are not limited to, rectifier linear activation function (ReLU), element-wise add, element-wise multiply average-pooling, max-pooling, batch normalization, layer normalization, lookup table, and other types of operations that are not performed on analog crossbar structures. Each compute-core 200 can be a digital circuit composed of a plurality of integrated circuits (ICs), and each IC within a compute-core 200 can be assigned to perform a specific auxiliary operation.

In one embodiment, each CC 200 situated between tiles 102 in device 114 can include a vector processing unit (VPU) 210 configured to perform the auxiliary operation of layer normalization. Layer normalization can be an auxiliary operation for normalizing distributions of intermediate layers in a deep neural network (DNN). VPU 210 can be an IC including digital circuit components such as adders, multipliers, static random access memory (SRAM) and registers (e.g., accumulators), and/or other digital circuit components that can be used for performing auxiliary operations.

VPU 210 can receive an input vector 202 from a tile among tiles 102. VPU 210 can normalize input vector 202 across vector-elements in input vector 202 using a mean and a standard-deviation of the vector-elements. The normalized vector can be an output vector 230. In one embodiment, input vector 202 can be a vector outputted from a layer of a DNN and the output vector 230 can be vector being inputted to a next layer of the DNN. If input vector 202 is denoted as x having a plurality of vector elements $x_k$, then output vector 230 can be denoted as X' having a plurality of vector elements $$X'_k$$

denoted as:

$$X'_k = \frac{x_k - \mu}{\sqrt{\sigma^2}}$$

where μ denotes a mean of the vector elements $x_k$ and σ denotes a standard deviation of the vector elements $x_k$ among input vector 202.

VPU 210 can be implemented as a pipelined vector-compute engine with three stages such as Stage 1, Stage 2 and Stage 3 shown in FIG. 2. Stage 1 can be implemented by a digital circuit 212. Digital circuit 212 can include, for example, a plurality of circuit blocks 214 (e.g., W circuit blocks 214) including circuit blocks 214-1, 214-2, . . . 214-W. Each one of circuit blocks 214 can be identical to one another (e.g., including identical components), and each one of circuit blocks 214 can be configured to implement a processing pipeline for P cycles (e.g., clock cycles). At each cycle among the P cycles, each one of circuit blocks 214 can receive Q vector elements among vector elements $x_k$ in parallel, and each one of circuit blocks 214 can generate a partial sum A and a partial sum B based on the received Q vector elements. In an aspect, W (the choice of the number of circuit blocks 214), Q (the choice of how many elements to process in parallel), and P (the choice of number of time-multiplexed calculations that each circuit-block 214-1, 214-2 can expect to initiate for input vector 202) can be chosen arbitrarily such that the product W*Q*P matches the width of input vector 202, so as to ensure that every vector element $x_k$ is processed appropriately.

The partial sum B can be a value that can be used by VPU 210 of compute-core 200 for estimating a scalar C that represents an inverse square-root of a variance of the vector elements $x_k$, and the partial sum A can be a value that can be used by VPU 210 of compute-core 200, together with scalar C, for estimating a scalar D that represents a negation of a product of a mean of the vector elements $x_k$ and the scalar C. At each one of the P cycles, each one of circuit blocks 214 can output a respective partial sum A and a respective partial sum B to Stage 2. For example, at each one of the P cycles, circuit block 214-1 can output partial sum A1 and partial sum B1 to Stage 2 and circuit block 214-2 can output partial sum A2 and partial sum B2 to Stage 2. Thus, after implementing Stage 1 for P cycles, Stage 1 can output a total of (P×W) partial sums A, and (P×W) partial sums B, to Stage 2.

In one embodiment, for example, if input vector 202 includes 512 vector elements (e.g., N=512), digital circuit 212 includes 8 circuit blocks (e.g., W=8), and each one of circuit blocks 214 is configured to receive and process 4 vector elements in parallel (e.g., Q=4), then Stage 1 can be implemented by circuit blocks 214 for 16 cycles (e.g., P=16) and each one of circuit block 214 can process a total of 64 vector elements after 16 cycles (Q=4 per cycle). After implementing Stage 1 for 16 cycles, Stage 1 can output a total of 128 first partial sums and 128 second partial sums to Stage 2. In one embodiment, the Q vector elements being received at circuit blocks 214 can be in half-precision floating-point (FP16) format.

Stage 2 can be implemented by a digital circuit 216. Digital circuit 216 can be configured to implement a processing pipeline for P cycles. At each cycle among the P cycles, digital circuit 216 can receive W partial sums A and W partial sums B. At each cycle among the P cycles, digital circuit 216 can sum the W partial sums B and the sum can be used for estimating a scalar C that represents the inverse square-root of a variance of the vector elements $x_k$. At each cycle among the m cycles, digital circuit 216 can sum the W partial sums A that can be used for estimating a scalar D that corresponds to a negation of a product of the mean μ of the vector elements $x_k$ and scalar C. Digital circuit 216 can output scalars C, D to circuit blocks 214 of digital circuit 212.

Stage 3 can be implemented by circuit blocks 214 of digital circuit 212. Each one of circuit blocks 214 can receive scalars C. D from digital circuit 216. At each cycle among the P cycles, each one of circuit blocks 220 can determine Q vector elements among vector elements $$X'_k$$

in parallel, and the Q vector elements $$X'_k$$

can be vector elements of output vector 230. Output vector 230 can be a normalized version of input vector 202, and output vector 230 can have the same number of vector elements as input vector 202.

The values of W and P can be adjustable depending on a size (e.g., number of vector elements) of the input vector 202 (e.g., the value of N). In one embodiment, if input vector 202 includes 1024 vector elements (e.g., N=1024), digital circuit 212 includes 8 circuit blocks (e.g., W=8), and each one of circuit blocks 214 is configured to receive and process Q vector elements in parallel (e.g., Q=4), then two VPUs 210 (or two compute-cores 200) can implement Stages 1, 2, and 3. Each one of the two VPUs can implement Stage 1 for 16 cycles (e.g., P=16). At Stage 2, digital circuit 216 in the two VPUs can exchange intermediate values that can be used for determining scalars C, D (further described below). Digital circuit 216 for the two VPUs can determine the same scalars C, D since scalars C, D correspond to the same input vector. At Stage 3, the two VPUs can determine a respective set of vector elements for output vector 230. For example, one of the VPU among the two VPUs can determine the $1^{st}$ to $512^{th}$ vector elements of output vector 230 and the other VPU among the two VPUs can determine the $513^{th}$ to $1024^{th}$ vector elements of output vector 230.

Figure 3A:
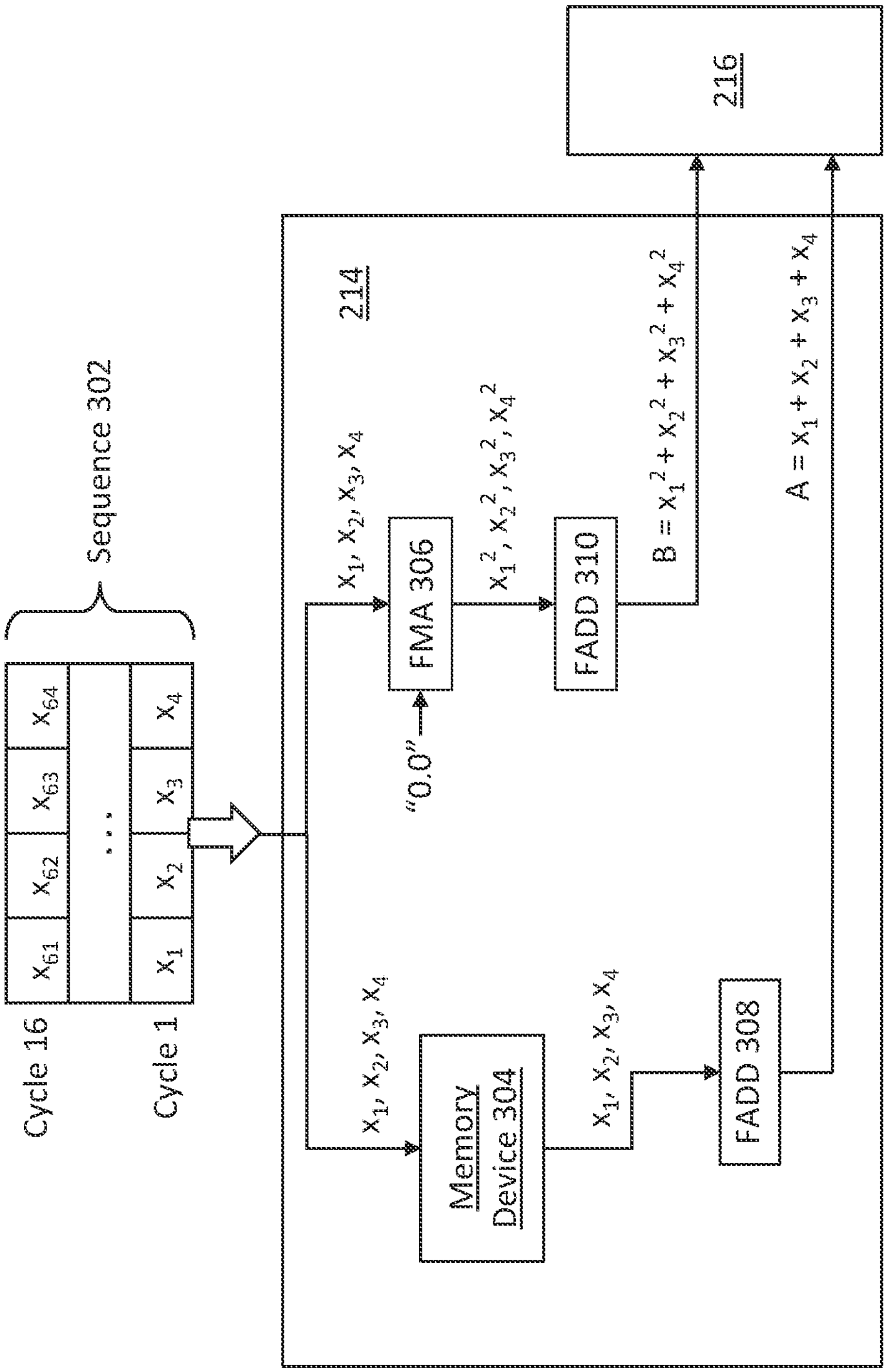
FIG. 3A is a diagram illustrating details of a digital circuit that can implement a first stage of a layer normalization operation implemented by a special-purpose digital-compute hardware for parallel layer-norm compute in one embodiment.

FIG. 3A is a diagram illustrating details of a digital circuit that can implement a first stage of a layer normalization operation implemented by a special-purpose digital-compute hardware for parallel layer-norm compute in one embodiment. An example implementation of one circuit block 214 in digital circuit 212 of FIG. 2 is shown in FIG. 3A. In Stage 1 of the layer normalization process described herein, circuit block 214 can receive a time-multiplexed sequence of input data, labeled as a sequence 302. Each input data among sequence 302 can include at least one vector element (e.g., Q vector elements) of a portion of an input vector 202 (e.g., 64 vector elements among 512 vector elements). In one embodiment, each input data among sequence 302 can be in FP16 format.

In an example shown in FIG. 3A, circuit block 214 can receive input data representing vector elements $x_1$, $x_2$, $x_3$, $x_4$ in Cycle 1, then $x_5$, $x_6$, $x_7$, $x_8$ in Cycle 2, and at Cycle 16 the last four vector elements $x_{61}$, $x_{62}$, $x_{63}$, $x_{64}$ are received. In response to receiving $x_1$, $x_2$, $x_3$, $x_4$, circuit block 214 can store $x_1$, $x_2$, $x_3$, $x_4$ in a memory device 304 and input $x_1$, $x_2$, $x_3$, $x_4$ to a fused-multiply-add (FMA) circuit 306. In one embodiment, memory device 304 can be a dual-port static random-access memory (SRAM). FMA circuit 306 can determine squares of each vector element among, such as $x_1^2$, $x_2^2$, $x_2^2$, $x_4^2$, and outputs the squares $x_1^2$, $x_2^2$, $x_2^2$, $x_4^2$ to a floating-point addition (FADD) circuit 310. In one embodiment, FMA circuit 306 can take three inputs X, Y, Z to perform X*Y+Z, thus digital circuit 212 can input a zero "0.0" as the Z input such that FMA circuit 306 can determine a square of a vector element using the vector element as the X and Y inputs. FADD circuit 310 can determine a sum of the squares $x_1^2$, $x_2^2$, $x_2^2$, $x_4^2$, and output the sum of the squares as a partial sum B. Circuit block 214 can wait for a predetermined number of cycles before transferring or loading vector elements $x_1$, $x_2$, $x_3$, $x_4$ from memory device 304 to a FADD circuit 308. FADD circuit 310 can determine a sum of the vector elements $x_1$, $x_2$, $x_3$, $x_4$, and output the sum as a partial sum A. Circuit block 214 can output partial sums A, B to digital circuit 216. While specific FMA, FADD, and SRAM units are indicated here, other implementations for performing these same mathematical operations can be used or contemplated.

In one embodiment, the predetermined number of cycles that circuit block 214 waits can be equivalent to a number of cycles it takes for FMA circuit 306 to determine the squares $x_1^2$, $x_2^2$, $x_2^2$, $x_4^2$. If FMA circuit 306 takes three cycles to determine the squares $x_1^2$, $x_2^2$, $x_2^2$, $x_4^2$, then circuit block 214 can wait for three cycles before transferring vector elements $x_1$, $x_2$, $x_3$, $x_4$ from memory device 304 to FADD circuit 308. By setting the predetermined number of cycles to be equivalent to the number of cycles it takes for FMA circuit 306 to determine the squares, FADD circuits 308, 310 can determine the partial sums A and B in parallel, and the output of partial sums A and B to digital circuit can be parallel or synchronized. Other implementations can be contemplated, which may take more or fewer clock cycles.

Figure 3B:
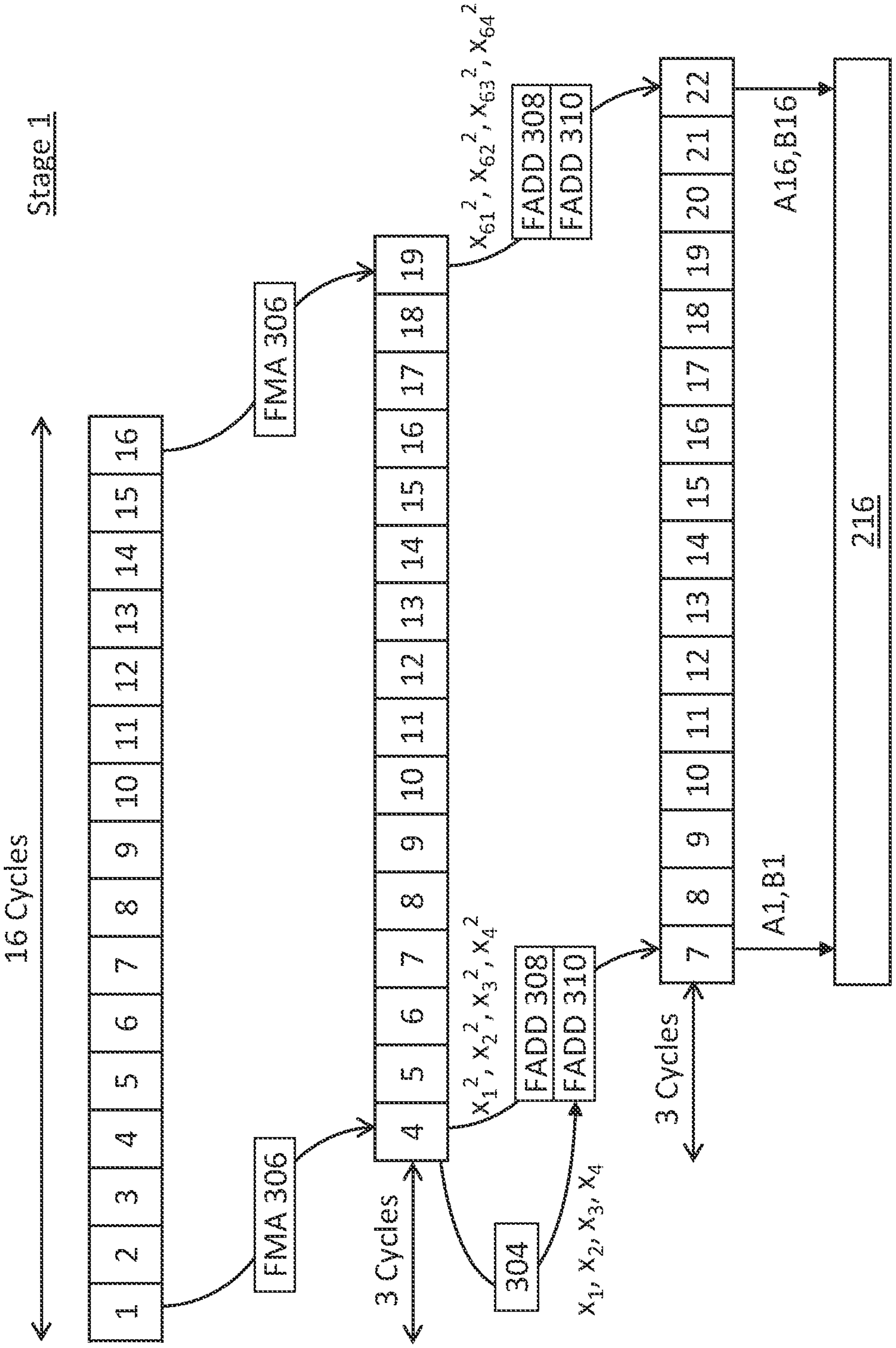
FIG. 3B is a timing diagram of the first stage shown in FIG. 3A in one embodiment.

FIG. 3B is a timing diagram of the first stage shown in FIG. 3A in one embodiment. In the timing diagram shown in FIG. 3B, FMA circuit 306 can take three cycles to output the squares. Input data received at Cycle 1 can be stored in memory device 304, and can be processed by FMA circuit 306 during Cycles 1-3, and at Cycle 4, FMA circuit 306 can output the squares of the input data received at Cycle 1 to FADD circuit 310. Input data received at Cycle 2 can be processed by FMA circuit 306 during Cycles 2-4, and at Cycle 5, FMA circuit 306 can output the squares of the input data received at Cycle 2 to FADD circuit 310. The last set of input data received at Cycle 16 can be processed by FMA circuit 306 during Cycles 16-18, and at Cycle 19, FMA circuit 306 can output the squares of the input data received at Cycle 19 to FADD circuit 310.

Circuit block 214 (FIG. 2, 3A) can wait for three cycles to transfer or load input data representing vector elements from memory device 304 to FADD circuit 308. FADD circuit 308 can receive input data from memory device 304, and FADD circuit 310 can receive squares of the input data from FMA circuit 306, at the same cycle. FADD circuits 308, 310 can take three cycles to determine and output partial sums A. B. As shown in FIG. 3B, squares being outputted by FMA circuit 306 at Cycle 4 can be processed by FADD circuit 308 during Cycles 4-6 to determine partial sum A1 corresponding to the input data received at Cycle 1. Further, input data received at Cycle 1, and stored in memory device 304, can be transferred or loaded to FADD circuit 310 at Cycle 4. The input data transferred from memory device 304 can be processed by FADD circuit 310 during Cycles 4-6 to determine B1 corresponding to the input data received at Cycle 1. FADD circuits 308, 310 can output partial sums A1, B1 to digital circuit 216 at Cycle 7. As a result of implementing Stage 1 as a pipelined process, FMA circuit 306 can output squares of the last set of input data, received at Cycle 16, at Cycle 19. FADD circuits 308, 310 can output partial sums A16, B16, corresponding to the input data received at Cycle 16, to digital circuit 216 at Cycle 22.

Figure 4A:
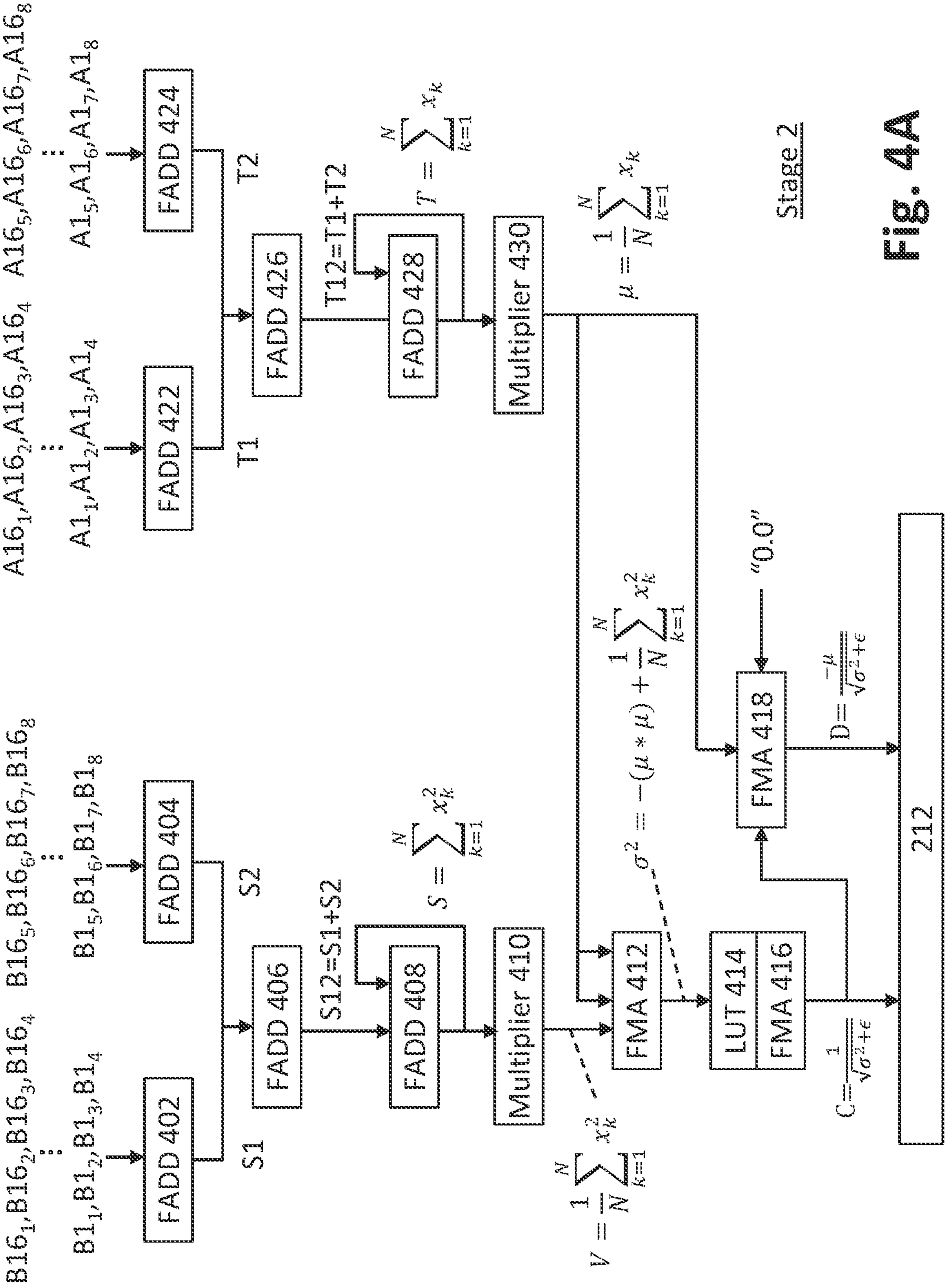
FIG. 4A is a diagram illustrating details of a digital circuit that can implement a second stage of a layer normalization operation implemented by a special-purpose digital-compute hardware for parallel layer-norm compute in one embodiment.

FIG. 4A is a diagram illustrating details of a digital circuit that can implement a second stage of a layer normalization operation implemented by a special-purpose digital-compute hardware for efficient parallel layer-norm compute in one embodiment. At stage 2 shown in FIG. 4A, digital circuit 216 (see FIG. 2 to FIG. 3B) can receive a sequence of partial sums A, B from circuit blocks 214 (see FIG. 2, FIG. 3A). If there are eight circuit blocks 214, then digital circuit 216 can receive eight partial sums A and eight partial sums B per cycle. In the example shown in FIG. 4A, partial sums A received at a first cycle (or Cycle 22 in FIG. 3B) are labeled as $\mathbf{A1}_1$, . . . $\mathbf{A1}_8$, and partial sums B received at the first cycle (or Cycle 22 in FIG. 3B) are labeled as $\mathbf{B1}_1$, . . . $\mathbf{B1}_8$. At the last cycle (e.g., after 16 cycles), digital circuit 216 can receive partial sums $\mathbf{A16}_1$, . . . $\mathbf{A16}_8$ and partial sums $\mathbf{B16}_1$, . . . $\mathbf{B16}_8$. After 16 cycles, digital circuit 216 can receive a total of 128 partial sums A and 128 partial sums B.

In response to receiving partial sums B at each cycle, digital circuit 216 can determine intermediate sum of the received partial sums B. In the example shown in FIG. 4A, a FADD circuit 402 can sum partial sums $\mathbf{B1}_1$, . . . $\mathbf{B1}_4$ received from a first set of four circuit blocks 214 to determine an intermediate sum S1=$\mathbf{B1}_1$+$\mathbf{B1}_2$+$\mathbf{B1}_3$+$\mathbf{B1}_4$). A FADD circuit 404 can sum partial sums $\mathbf{B1}_5$, . . . $\mathbf{B1}_8$ received from a second set of four circuit blocks 214 to determine an intermediate sum S2=$\mathbf{B1}_5$+$\mathbf{B1}_6$+$\mathbf{B1}_7$+$\mathbf{B1}_8$). S1 and S2 can be fed into a FADD circuit 406 and FADD circuit 406 can determine an intermediate sum S12=S1+S2.

Note that $\mathbf{B1}_1$ is a sum of the first four vector element squares, such as $\mathbf{B1}_1$=$x_1^2$+$x_2^2$+$x_3^2$+$x_4^2$ and $\mathbf{B1}_8$ is a sum of another set of vector element squares, such as $\mathbf{B1}_8$=$x_{449}^2$+$x_{450}^2$+$x_{451}^2$+$x_{452}^2$. Hence, the intermediate sum S12 determined based on partial sums $\mathbf{B1}_1$ to $\mathbf{B1}_8$ is a sum of squares of 32 of the 512 vector elements among input vector 202 (see FIG. 2). An intermediate sum S12 determined based on partial sums $\mathbf{B2}_1$ to $\mathbf{B2}_8$ is a sum of squares of another 32 of the 512 vector elements among input vector 202.

Intermediate sum S12 can be inputted into a FADD 408. FADD 408 can be a looped-accumulator, such as a 2-wide FADD unit with loopback, such that FADD 408 can determine a sum between intermediate sum S12 and a previous value of S12. For example, if the intermediate sum S12 determined based on partial sums $\mathbf{B1}_1$ to $\mathbf{B1}_8$ is inputted from FADD circuit 406, FADD circuit 408 can determined a sum of S12 and zero (since there is no previous value of S12). FADD circuit 408 can feed back output S12 determined based on partial sums $\mathbf{B1}_1$ to $\mathbf{B1}_8$ to FADD circuit 408, and not output S12 determined based on partial sums $\mathbf{B1}_1$ to $\mathbf{B1}_8$ to a next circuit (e.g., multiplier circuit 410). When FADD circuit 406 inputs S12 determined based on partial sums $\mathbf{B2}_1$ to $\mathbf{B2}_8$, FADD circuit 408 can sum the S12 determined based on partial sums $\mathbf{B2}_1$ to $\mathbf{B2}_8$ with S12 determined based on partial sums $\mathbf{B1}_1$ to $\mathbf{B1}_8$, and this updated value of S12 can be fed back to FADD circuit 408 again. In one embodiment, additional mantissa bits may be allocated within FADD circuit 408 in order to avoid rounding errors on the least significant bit of the mantissa bits. In one embodiment, multiplier circuit 410 can be a custom divider, using either a right-shift when N is a power of 2, or right-shift scaling plus some logic for other values of N (e.g., N=384 or 768). Alternatively, to cover all possible values of N, a look-up table or other implementation of the divide-by-N operation can be implemented.

When FADD circuit 406 inputs S12 determined based on the last set of partial sums $\mathbf{B16}_1$ to $\mathbf{B16}_8$, FADD circuit 408 can sum the S12 determined based on partial sums $\mathbf{B16}_1$ to $\mathbf{B16}_8$ with S12 determined based on partial sums B151 to B158, and this updated value of S12 is outputted to multiplier circuit 410 and not fed back to FADD circuit 408. After determination of the last S12, a final accumulated sum S is a sum of partial sums $B1_1$ to $B16_8$, and S is also a sum of squares of all vector elements $x_k$ (e.g., sum of $x_k^2$) among input vector 202. Multiplier circuit 410 can receive the final accumulated sum S and multiple with S with 1/N, where N is the number of vector elements in input vector 202 (e.g., 1/N=1/512 if input vector 202 has 512 vector elements). Multiplier circuit 410 can output the product of 1/N and S as an intermediate value V.

In response to receiving partial sums A at each cycle, digital circuit 216 can determine intermediate sum of the received partial sums A. In the example shown in FIG. 4A, a FADD circuit 422 can sum partial sums $A1_1, \ldots A1_4$ received from a first set of four circuit blocks 214 to determine an intermediate sum $T1=A1_1+A1_2+A1_3+A1_4$). A FADD circuit 424 can sum partial sums $A1_5, \ldots A1_8$ received from a second set of four circuit blocks 214 to determine an intermediate sum $T2=A1_5+A1_6+A1_7+A1_8$). T1 and T2 can be fed into a FADD circuit 426 and FADD circuit 426 can determine an intermediate sum T12=T1+T2.

Note that $A1_1$ is a sum of the first four vector elements, such as $A1_1=x_1+x_2+x_3+x_4$ and $A1_8$ is a sum of another set of vector elements, such as $A1_8=x_{449}+x_{450}+x_{451}+x_{452}$. Hence, the intermediate sum T12 determined based on partial sums $A1_1$ to $A1_8$ is a sum of 32 of the 512 vector elements among input vector 202 (see FIG. 2). An intermediate sum T12 determined based on partial sums $A2_1$ to $A2_8$ is a sum of another 32 of the 512 vector elements among input vector 202.

Intermediate sum T12 can be inputted into a FADD circuit 428. FADD circuit 428 can be a looped-accumulator, such as a 2-wide FADD unit with loopback, such that FADD circuit 428 can determine a sum between intermediate sum T12 and a previous value of T12. For example, if the intermediate sum T12 determined based on partial sums $A1_1$ to $A1_8$ is inputted from FADD circuit 426, FADD circuit 428 can determined a sum of T12 and zero (since there is no previous value of T12). FADD circuit 428 can feed back output T12 determined based on partial sums $A1_1$ to $A1_8$ to FADD circuit 428, and not output T12 determined based on partial sums $A1_1$ to $A1_8$ to a next circuit (e.g., multiplier circuit 430). When FADD circuit 426 inputs T12 determined based on partial sums $A2_1$ to $A2_8$, FADD circuit 428 can sum the T12 determined based on partial sums $A2_1$ to $A2_8$ with T12 determined based on partial sums $A1_1$ to $A1_8$, and this updated value of T12 can be fed back to FADD circuit 428 again. In one embodiment, additional mantissa bits may be allocated within FADD circuit 428 in order to avoid rounding errors on the least significant bit of the mantissa bits. In one embodiment, multiplier circuit 430 can be a custom divider, using either a right-shift when N is a power of 2, or right-shift scaling plus some logic for other values of N (e.g., N=384 or 768).

When FADD circuit 426 inputs T12 determined based on the last set of partial sums $A16_1$ to $A16_8$, FADD circuit 428 can sum the T12 determined based on partial sums $A16_1$ to $A16_8$ with T12 determined based on partial sums A151 to A158, and this updated value of T12 is outputted to multiplier circuit 430 and not fed back to FADD circuit 428. After determination of the last T12, a final accumulated sum T is a sum of partial sums $A1_1$ to $A16_8$, and T is also a sum of all vector elements $x_k$ (e.g., sum of $x_k$) among input vector 202. Multiplier circuit 430 can receive the final accumulated sum T and multiple with T with 1/N, where N is the number of vector elements in input vector 202. Multiplier circuit 410 can output the product of 1/N and T as a mean μ, where μ is a mean of the N vector elements of input vector 202.

Multiplier circuit 410 can output intermediate value V to a FMA circuit 412, and multiplier circuit 410 can output the mean u to FMA circuit 412. FMA circuit 412 can receive three inputs, intermediate value V can be a first input, and the mean μ can be the second and third input. FMA 412 can multiply (μ*μ) by −1 and can determine a variance $\sigma^2=-(\mu*\mu)+V$ of the N vector elements. The variance $\sigma^2$ can be used as an input key to a lookup table (LUT) 414 and LUT 414 can output a scalar C, where scalar C can be an inverse square-root of the variance and $$C=\frac{1}{\sqrt{\sigma^2+\epsilon}},$$

where ϵ is a constant designed to protect against division-by-zero and thus specify a maximum possible output. In one embodiment, LUT 414 can be hard coded in digital circuit 216.

In one embodiment LUT 414 can be a FP16 lookup table including data bins, and each data bin can include a range of values. Digital circuit 216 can input $\sigma^2$ to LUT 414 as input key, and can compare $\sigma^2$ against bin edges (e.g., bounds of the ranges of values of the bins) to identify a bin that includes a value equivalent to $\sigma^2$. In response to identifying a bin, digital circuit 216 can retrieve a slope value (SLOPE) and an offset value (OFFSET) corresponding to the identified bin and input SLOPE and OFFSET to a FMA circuit 416. FMA circuit 416 can determine SLOPE*$\sigma^2$+OFFSET to estimate scalar C. The utilization of the lookup table can prevent scalar C from approaching infinity when $\sigma^2$ approaches zero. In one embodiment, digital circuit 216 can also add a protection value e such that scalar C is $$\frac{1}{\sqrt{\sigma^2+\epsilon}},$$

instead of $$\frac{1}{\sqrt{\sigma^2}},$$

and scalar C can be capped at a predefined maximum value. Hence, the utilization of LUT 414 and protection value e can cap scalar C to a predefined value and prevent scalar C from approaching infinity.

FMA circuit 416 can output scalar C to a FMA circuit 418 of digital circuit 216. Multiplier circuit 430 can also output mean μ to FMA circuit 418. FMA circuit 418 can determine a product of mean μ and scalar C, and multiply the product by −1, to determine a scalar D. In one embodiment, FMA circuit 418 can take three inputs X, Y, Z to perform X*Y+Z, thus digital circuit 216 can input a zero "0.0" as the Z input such that FMA circuit 418 can determine the product D using −μ and scalar C as the X and Y inputs. FMA circuit 416 can output scalar C to digital circuit 212, and FMA circuit 418 can output scalar D to digital circuit 212, to implement Stage 3.

Figure 4B:
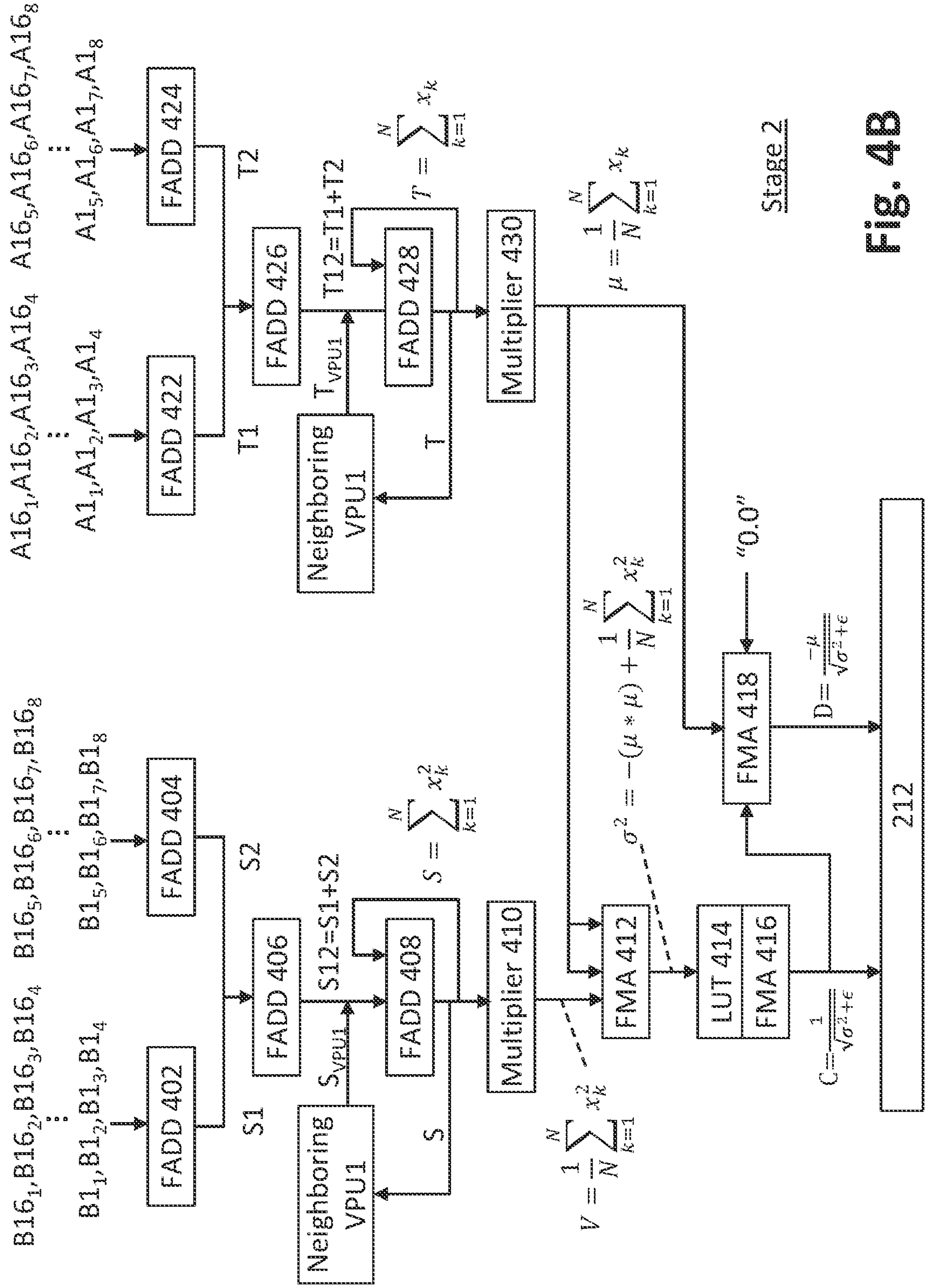
FIG. 4B is a diagram illustrating another implementation of the second stage of a layer normalization operation implemented by a special-purpose digital-compute hardware for parallel layer-norm compute in one embodiment.

FIG. 4B is a diagram illustrating another implementation of the second stage of a layer normalization operation implemented by a special-purpose digital-compute hardware for efficient parallel layer-norm compute in one embodiment. If compute-cores 200 (see FIG. 2) are configured to process N vector elements and input vector 202 (see FIG. 2) includes more than N vector elements, more than one compute-cores 200 can be utilized to perform layer normalization to generate output vector 230. In an example shown in FIG. 4B, after FADD circuit 408 determined the final intermediate sum S, FADD circuit 408 can provide S to a neighboring VPU labeled as VPU1. Further, after FADD circuit 408 determined S, FADD circuit 408 can receive a final intermediate sum $S_{VPU1}$ from VPU1, and determine a sum between $S_{VPU1}$ and S. If N=1024 (e.g., input vector 202 includes 1024 vector elements) and each compute-core 200 can process 512 vector elements, then S can be a sum of squares of vector elements $x_1$ to $x_{512}$, and $S_{VPU1}$ can be a sum of the squares of vector elements $x_{513}$ to $x_{1024}$. Hence, a sum of S and $S_{VPU1}$ can be a sum of the squares of the 1024 vector elements in input vector 202.

Further, after FADD circuit 428 determined the final intermediate sum T, FADD circuit 428 can provide T to VPU1. Further, after FADD circuit 428 determined T, FADD circuit 428 can receive a final intermediate sum $T_{VPU1}$ from VPU1, and determine a sum between $T_{VPU1}$ and T. If N=1024 and each compute-core 200 can process 512 vector elements, then T can be a sum of vector elements $x_1$ to $x_{512}$, and $T_{VPU1}$ can be a sum of vector elements $x_{513}$ to $x_{1024}$. Hence, a sum of T and $T_{VPU1}$ can be a sum of the 1024 vector elements in input vector 202.

Figure 4C:
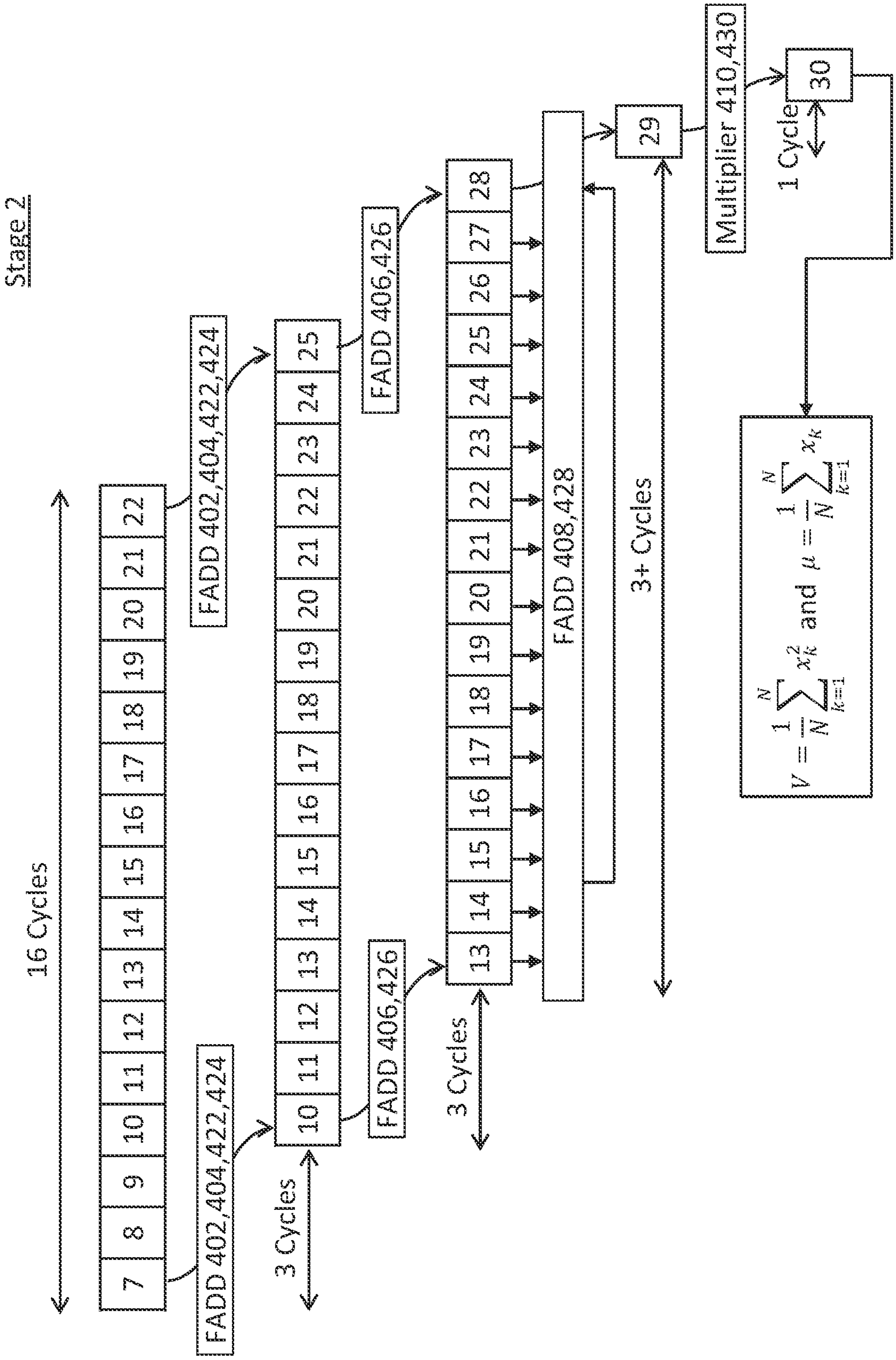
FIG. 4C is a timing diagram of the second stage shown in FIG. 4A in one embodiment.

FIG. 4C is a timing diagram of the second stage shown in FIG. 4A in one embodiment. In the timing diagram shown in FIG. 4C, each one of FADD circuits 402, 404, 422, 424 can take three cycles to accumulate four partial sums (four partial sums A or four partial sums B) for determining intermediate sums S1, S2, T1, T2 in FIG. 4A. Partial sums received at Cycle 7 can be accumulated by FADD circuits 402, 404, 422, 424 and the sums resulting from the accumulations can be outputted to FADD circuits 406, 426 at Cycle 10. Each one of FADD circuits 406, 426 can take three cycles to determine intermediate sums S12 and T12 in FIG. 4A. Intermediate sums received at Cycle 10 can be accumulated by FADD circuits 406, 426 and intermediate sums S12, T12 can be outputted to FADD circuits 408, 428 at Cycle 13.

Each one of FADD circuits 408, 428 can take at least three cycles to determine final values S and T of intermediate sums S12 and T12, respectively, shown in FIG. 4A. In one or more embodiments, the number of feedback loops used by FADD circuits 408, 428 to update S12 and T12 can determine the number of cycles needed for FADD circuits 408, 428 to determine S and T. For example, if Stage 2 receives partial sums A, B for 16 cycles, then FADD circuits 408, 428 can take 16 cycles to complete updating S12, T12 to determine S and T. Further, if more than one VPUs are being used (e.g., N being greater than the number of vector elements that can be processed by one compute-core 200), then FADD circuits 408, 428 may need additional cycles to exchange S and T, and add any incoming values of S and T to its own S and T values. In the example shown in FIG. 4C, FADD circuits 408, 428 can take 16 cycles to obtain S and T and can output S and T to multiplier circuits 410, 430 at Cycle 29. Each one of multiplier circuits 410, 430 can take one cycle to multiply 1/N with the S and T values to obtain intermediate value V and mean μ.

Figure 4D:
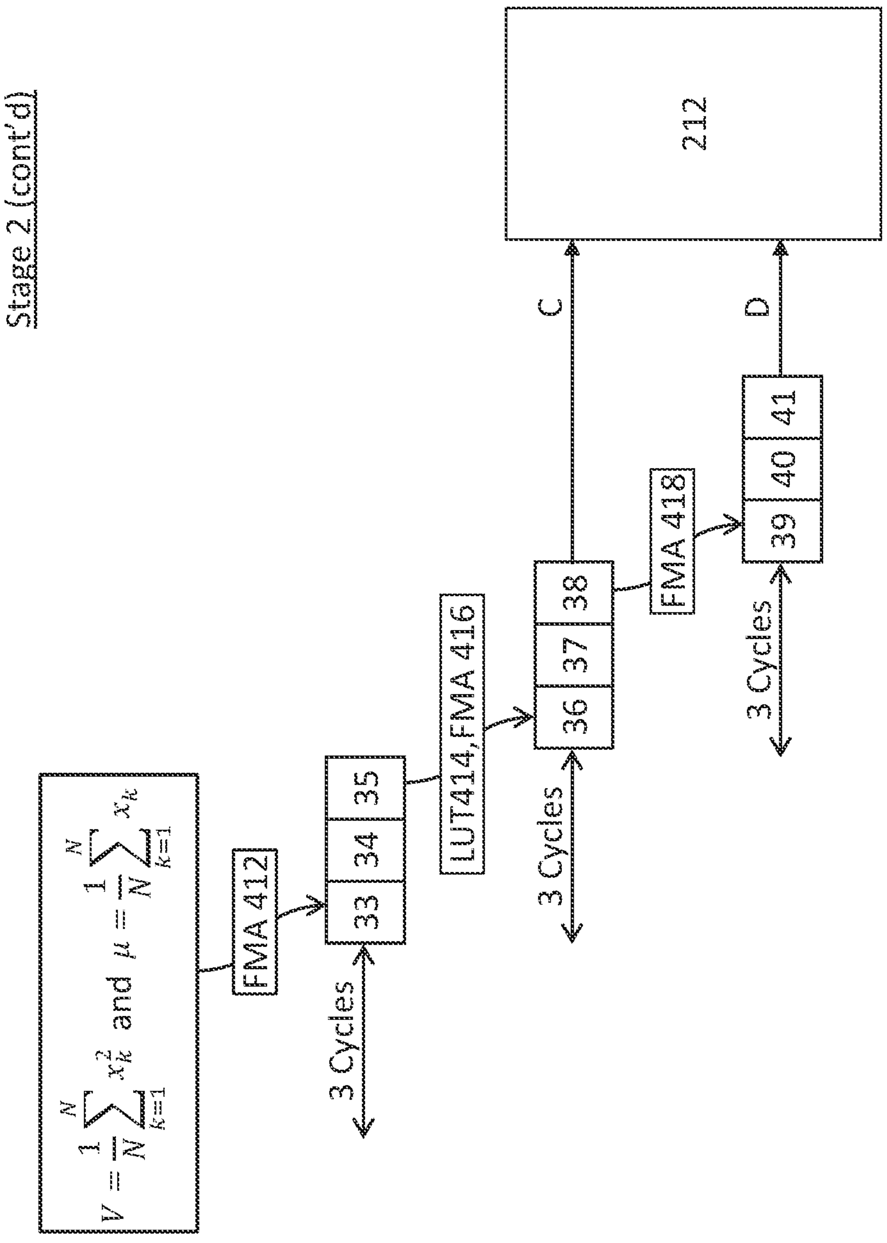
FIG. 4D is continuation of the timing diagram shown in FIG. 4C in one embodiment.

FIG. 4D is continuation of the timing diagram shown in FIG. 4C in one embodiment. FMA circuit 412 can receive intermediate value V and mean μ, and can take 3 cycles to determine variance $\sigma^2$. FMA circuit 412 can output variance $\sigma^2$ to LUT 414 at Cycle 35. Digital circuit 216 can take 3 cycles to use LUT 414 to identify slope and offset that can be inputted to FMA circuit 416 and to implement FMA circuit 416 to determine scalar C. Scalar C can be outputted to digital circuit 212 and to FMA circuit 418 at Cycle 38. FMA circuit 418 can take 3 cycles to determine scalar D and scalar D can be outputted to digital circuit 212 at Cycle 41.

Figure 5A:
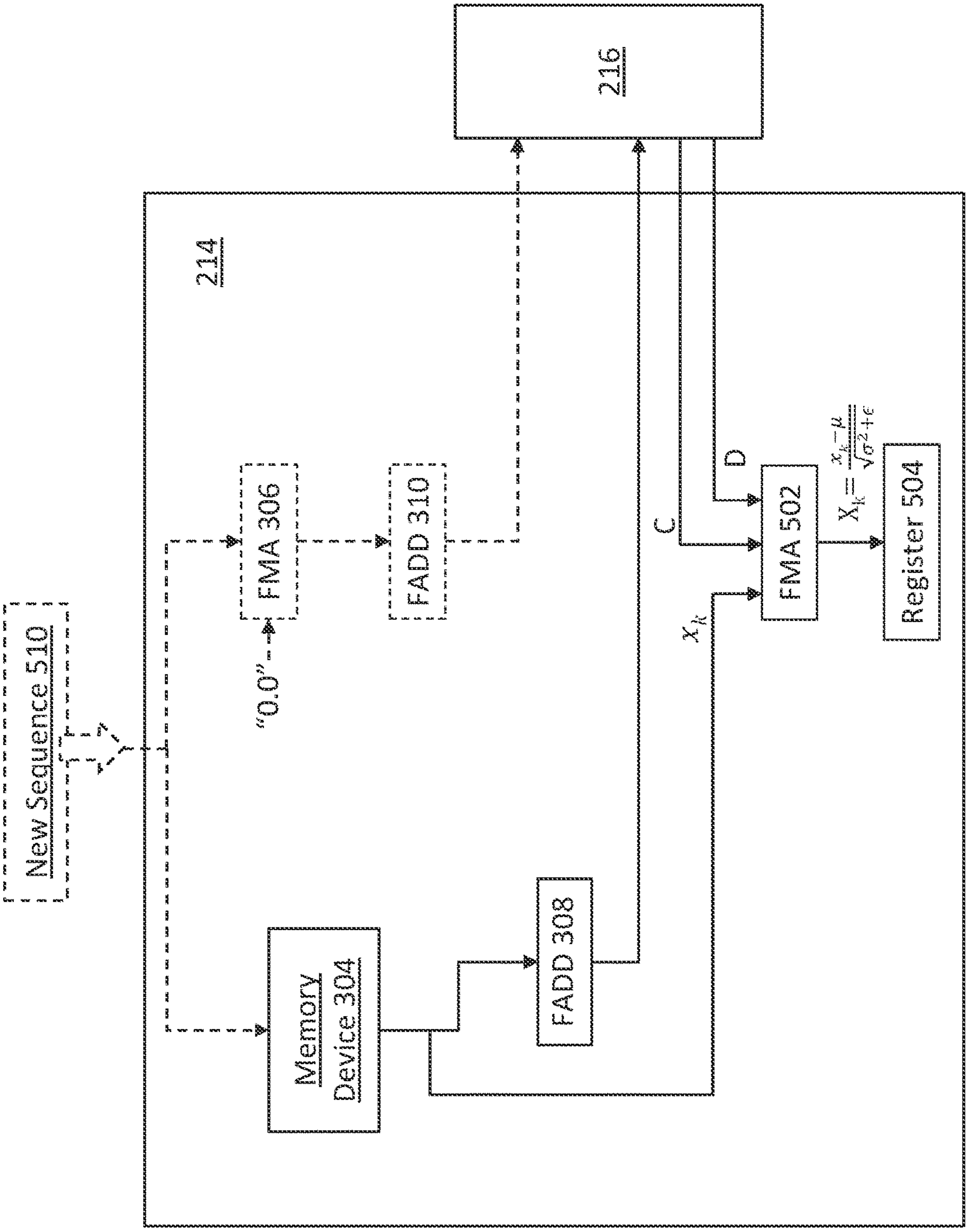
FIG. 5A is a diagram illustrating details of a digital circuit that can implement a third stage of a layer normalization operation implemented by a special-purpose digital-compute hardware for parallel layer-norm compute in one embodiment.

FIG. 5A is a diagram illustrating details of a digital circuit that can implement a third stage of a layer normalization operation implemented by a special-purpose digital-compute hardware for efficient parallel layer-norm compute in one embodiment. Circuit blocks 214 can implement Stage 3 of the layer normalization process described herein. In Stage 3, each circuit block 214 can receive scalars C and D from digital circuit 216. Vector elements $x_k$ among the received sequence 302 of input data (see FIG. 3A) that are stored in memory device 304 in Stage 1 can be loaded or transferred to a FMA circuit 502 of circuit block 214. FMA circuit 502 can determine vector elements $X_k$ of output vector 230 based on the vector elements $x_k$ and the scalars C and D. Each vector element $X_k$ can be equivalent to $x_k$*C+D. In one embodiment, FMA circuit 502 can output vector elements $X_k$ to a register 504 as a time-multiplexed sequence. In one embodiment, vector elements $X_k$ can be outputted to register 504 in FP16 format.

In one embodiment, Stage 3 and a new instance of Stage 1 for a new sequence 510 of input data can be implemented simultaneously in response to a predefined condition. By way of example, in response to multiplier circuits 410, 430 generating variance V and mean μ, digital circuit 216 can notify digital circuit 212 that circuit blocks 214 can receive new sequence 510 to start normalization for a new input vector.

Figure 5B:
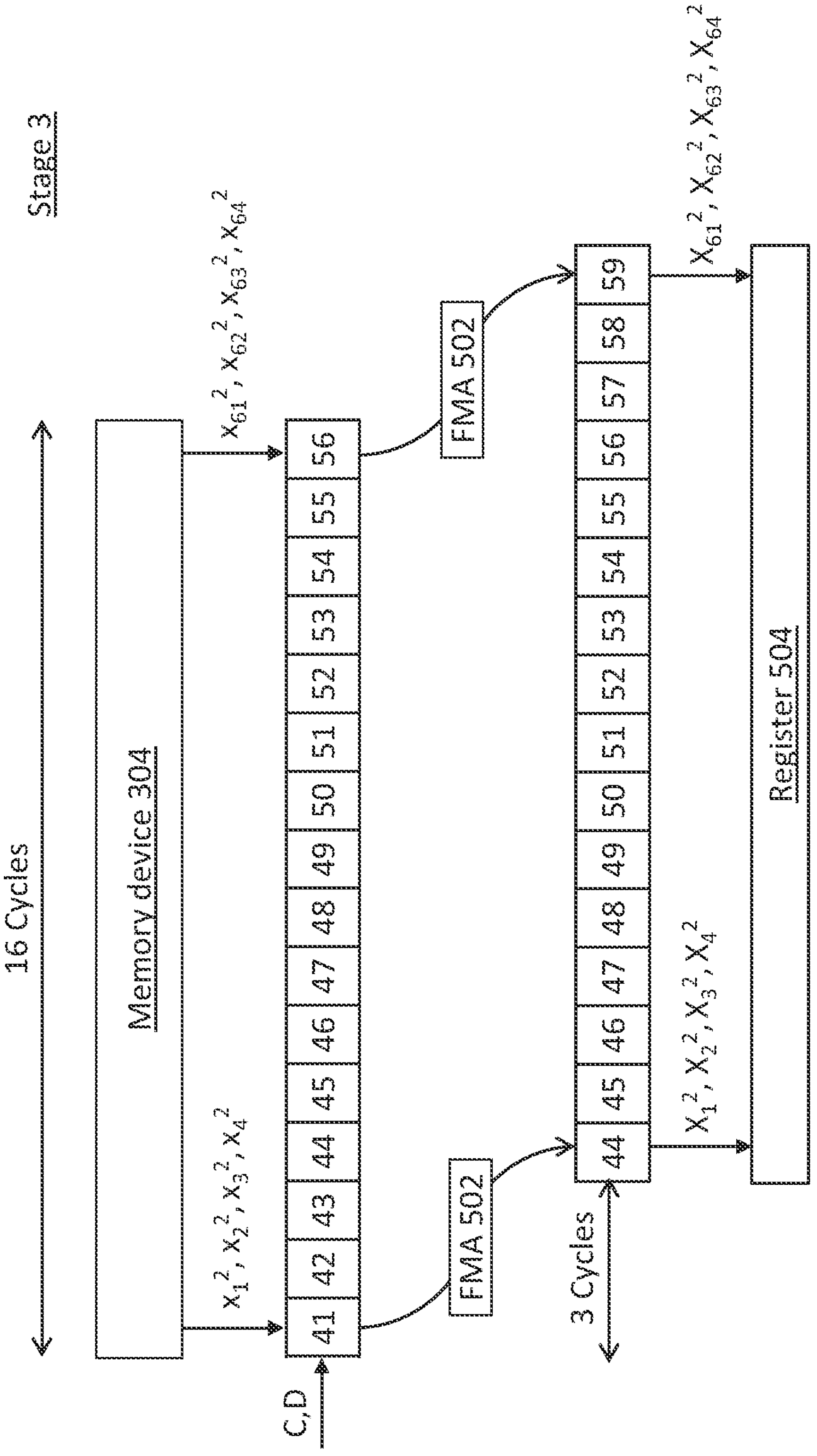
FIG. 5B is a timing diagram of the third stage shown in FIG. 5A in one embodiment.

FIG. 5B is a timing diagram of the third stage shown in FIG. 5A in one embodiment. In one embodiment, continuing from Stage 2 in FIG. 4D, at Cycle 41, circuit block 214 can have access to scalars C, D and the first set of vector elements $x_1$, $x_2$, $x_3$, $x_4$ from memory device 304. FMA circuit 502 can take 3 cycles to generate corresponding vector elements $x_1$, $x_2$, $x_3$, $x_4$. At Cycle 44, FMA circuit 502 can output vector elements $x_1$, $x_2$, $x_3$, $x_4$ to register 504. At Cycle 56 (e.g., after 16 cycles), FMA circuit 502 can take 3 cycles to generate vector elements $x_{61}$, $x_{62}$, $x_{63}$, $x_{64}$ based on scalars C. D and vector elements $x_{61}$, $x_{62}$, $x_{63}$, $x_{64}$. At Cycle 59, FMA circuit 502 can output vector elements $x_{61}$, $x_{62}$, $x_{63}$, $x_{64}$ to register 504.

In the example embodiments shown herein, it takes approximately 60 cycles to normalize a 512-element input vector using eight circuit blocks 214. The number of vector elements in the input vector, the number of compute-cores 200, and the number of circuit blocks 214 in digital circuit 212, can impact the total amount of time or cycles to normalize the input vector. For example, input vectors having more than 512 vector elements may utilize another compute-core 200 and the intermediate sums being exchanged between different compute-cores 200 can increase the amount of time to normalize the input vector. Further, FADD circuits in digital circuits 212, 216 can be configurable. For example, a FADD circuit that sums four elements can take 3 cycles to generate a sum, but a FADD circuit that sums different number of elements can use different number of cycles to generate a sum. Hence, the systems and methods described herein can provide flexibility to normalize vectors of various size using different combinations of hardware components.

Further, the pipelined process in Stage 1, Stage 2, Stage 3, the utilization of memory device 304 for temporary storage of input vector elements, and utilization of a lookup table to estimate scalars, a computation of layer normalization in ANN applications can be improved. The parallel computing resulting from the pipelined process can improve throughput and energy-efficiency. The compute-cores and digital circuits within the compute-cores are customized for normalization vectors having relatively large amount of vector elements, and these customized hardware can be more energy efficient when compared to conventional systems that utilize microprocessors or multi-processors utilizing conventional memory space and instruction set architecture. Furthermore, by using a dual-port SRAM (e.g., memory device 304), a new set of inputs could be entering circuit blocks 214 to implement a new instance of Stage 1 while Stage 3 is being implement simultaneously.

Figure 6:
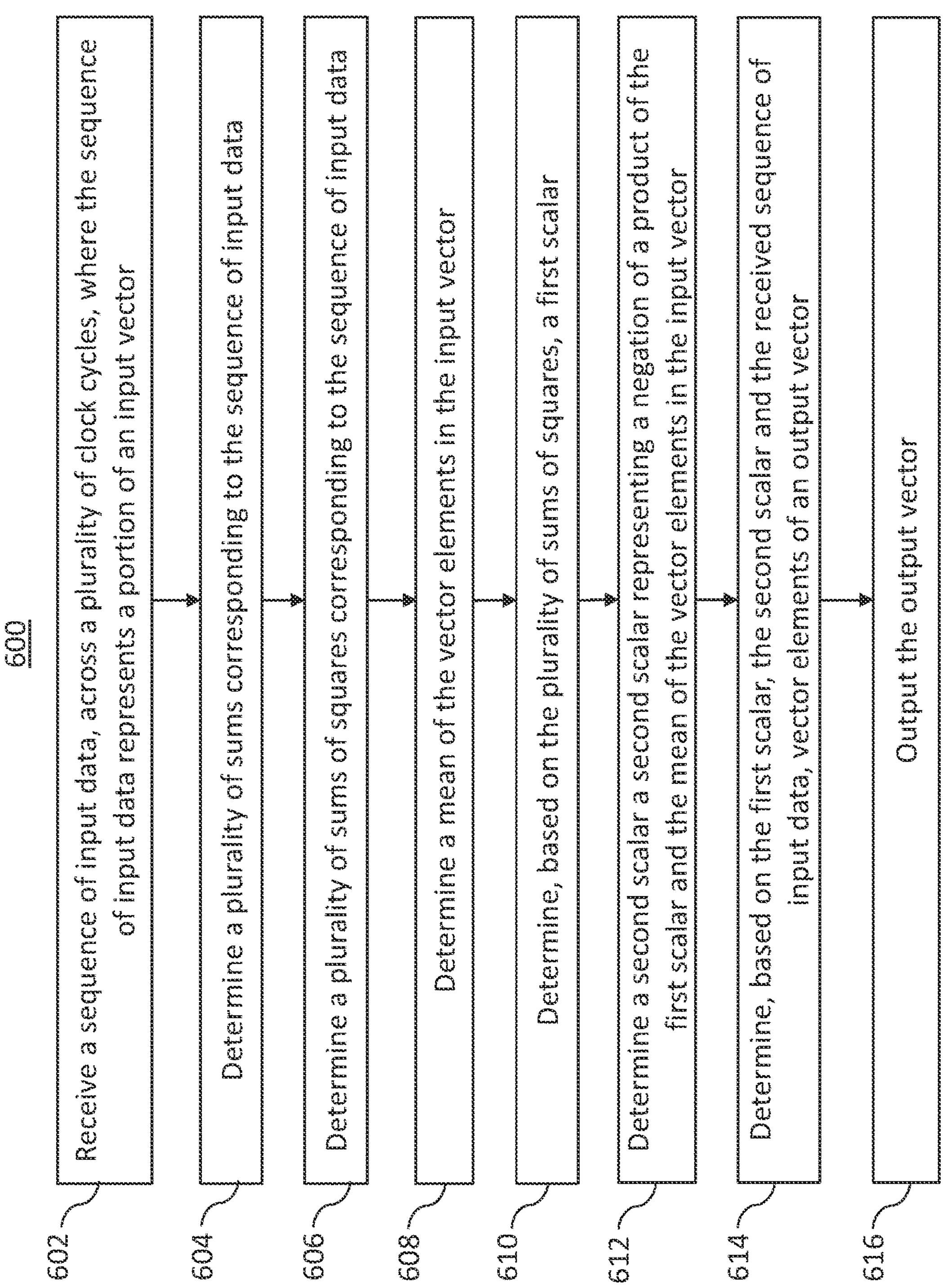
FIG. 6 is a flow diagram illustrating a method implemented by a special-purpose digital-compute hardware for parallel layer-norm compute in one embodiment.

FIG. 6 is a flow diagram illustrating a process 600 implemented by a special-purpose digital-compute hardware for efficient parallel layer-norm compute in one embodiment. The process 600 in FIG. 6 may be implemented using, for example, device 114 discussed above. Process 600 may include one or more operations, actions, or functions as illustrated by one or more of blocks 602, 604, 606, 608, 610, 612, 614 and/or 616. Although illustrated as discrete blocks, various blocks may be divided into additional blocks, combined into fewer blocks, eliminated, performed in different order, or performed in parallel, depending on the desired implementation.

Process 600 can begin at block 602. At block 602, a circuit can receive a sequence of input data, across a plurality of clock cycles, from a first crossbar array of memory elements. The sequence of input data can represent a portion of an input vector, and each input data among the sequence include data elements can represent a subset of vector elements in the portion of the input vector. Process 600 can proceed from block 602 to block 604. At block 604, the circuit can determine a plurality of sums corresponding to the sequence of input data. Each sum among the plurality of sums is a sum of the subset of vector elements in corresponding input data.

Process 600 can proceed from block 604 to block 606. At block 606, the circuit can determine a plurality of sums of squares corresponding to the sequence of input data. Each sum of squares among the plurality of sums of squares can be a sum of squares of the subset of vector elements in corresponding input data. In one embodiment, the circuit can determine a sum of a corresponding input data among the plurality of sums, and a sum of squares of the corresponding input data among the plurality of sums of squares, in parallel.

Process 600 can proceed from block 606 to block 608. At block 608, the circuit can determine a mean of the vector elements in the input vector. Process 600 can proceed from block 608 to block 610. At block 610, the circuit can determine, based on the plurality of sums of squares, a first scalar representing an inverse square-root of a variance of the vector elements in the input vector. In one embodiment, the circuit can determine the first scalar by using a look-up table. Process 600 can proceed from block 608 to block 612. At block 612, the circuit can determine a second scalar representing a negation of a product of the first scalar and the mean of the vector elements in the input vector.

In one embodiment, the circuit can further receive an intermediate sum of squares from a neighboring integrated circuit. The circuit can determine, based on the plurality of sums of squares and the received intermediate sum of squares, the first scalar. The circuit can receive an intermediate sum of squares from the neighboring integrated circuit. The circuit can determine, based on the plurality of sums and the received intermediate sum of squares, the second scalar.

Process 600 can proceed from block 612 to block 614. At block 614, the circuit can determine, based on the first scalar, the second scalar and the received sequence of input data, vector elements of an output vector, where the output vector can be a normalization of the input vector. Process 600 can proceed from block 614 to block 616. At block 616, the circuit can output the output vector to a second crossbar array of memory elements. In one embodiment, the circuit can store the sequence of input data in a memory device. The circuit can further retrieve the sequence of input data from the memory device to determine the vector elements of the output vector. In one embodiment, the memory device can be a dual-port static random-access memory (SRAM).

In one embodiment, the input vector can be a vector outputted from a first layer of a neural network implemented by the first crossbar array. The output vector can be a vector can be inputted to a second layer of the neural network implemented by the second crossbar array. In one embodiment, the sequence of input data can be a time-multiplexed sequence and the vector elements of the output data can be outputted as another time-multiplexed sequence.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be implemented substantially concurrently, or the blocks may sometimes be implemented in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms “a”, “an” and “the” are intended to include the plural forms as well, unless the context clearly indicates otherwise. As used herein, the term “or” is an inclusive operator and can mean “and/or”, unless the context explicitly or clearly indicates otherwise. It will be further understood that the terms “comprise”, “comprises”, “comprising”, “include”, “includes”, “including”, and/or “having.” when used herein, can specify the presence of stated features, integers, steps, operations, elements, and/or components, but do not preclude the presence or addition of one or more other features, integers, steps, operations, elements, components, and/or groups thereof. As used herein, the phrase “in an embodiment” does not necessarily refer to the same embodiment, although it may. As used herein, the phrase “in one embodiment” does not necessarily refer to the same embodiment, although it may. As used herein, the phrase “in another embodiment” does not necessarily refer to a different embodiment, although it may. Further, embodiments and/or components of embodiments can be freely combined with each other unless they are mutually exclusive.

As used herein, a "module" or "unit" may include hardware (e.g., circuitry, such as an application specific integrated circuit), firmware and/or software executable by hardware (e.g., by a processor or microcontroller), and/or a combination thereof for carrying out the various operations disclosed herein. For example, a processor or hardware may include one or more integrated circuits configured to perform function mapping or polynomial fits based on reading currents outputted from one or more of the output lines of the crossbar array at different time points, and/or apply the function to subsequent outputs to correct or compensate for temporal conductance variations in the crossbar array. The same or another processor may include circuits configured to input activation vectors encoded as electric pulse durations and/or voltage signals across the input lines for the crossbar array to perform its operations.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. An integrated circuit comprising:

a plurality of circuit blocks;

a digital circuit;

each circuit block among the plurality of circuit blocks configured to:

receive a sequence of input data across a plurality of clock cycles, wherein the sequence of input data represents a portion of an input vector, and each input data among the sequence includes data elements representing a subset of vector elements in the portion of the input vector;

determine a plurality of sums corresponding to the sequence of input data, wherein each sum among the plurality of sums is a sum of the subset of vector elements in corresponding input data;

determine a plurality of sums of squares corresponding to the sequence of input data, wherein each sum of squares among the plurality of sums of squares is a sum of squares of the subset of vector elements in corresponding input data;

output the plurality of sums and the plurality of sums of squares to the digital circuit;

the digital circuit configured to:

determine, based on the plurality of sums, a mean of the vector elements in the input vector;

determine, based on the plurality of sums of squares, a first scalar representing an inverse square-root of a variance of the vector elements in the input vector;

determine a second scalar representing a negation of a product of the first scalar and the mean of the vector elements in the input vector;

output the first scalar and the second scalar to the plurality of circuit blocks; and each circuit block among the plurality of circuit blocks being further configured to determine, based on the first scalar, the second scalar and the received sequence of input data, vector elements of an output vector, wherein the output vector is a normalization of the input vector.

2. The integrated circuit of claim 1, wherein each circuit block among the plurality of circuit blocks comprises a memory device, and each circuit block among the plurality of circuit blocks is configured to:

store the sequence of input data in the memory device; and retrieve the sequence of input data from the memory device to determine the vector elements of the output vector.

3. The integrated circuit of claim 2, wherein the memory device is a dual-port static random-access memory (SRAM).

4. The integrated circuit of claim 1, wherein:

the input vector is a vector outputted from a first layer of a neural network implemented by a first crossbar array of memory elements in an analog memory device; and the output vector is a vector being inputted to a second layer of the neural network implemented by a second crossbar array of memory elements in the analog memory device.

5. The integrated circuit of claim 4, wherein each circuit block among the plurality of circuit blocks is configured to determine a sum of a corresponding input data among the plurality of sums, and a sum of squares of the corresponding input data among the plurality of sums of squares, in parallel.

6. The integrated circuit of claim 1, wherein the digital circuit is configured to determine the first scalar by using a look-up table.

7. The integrated circuit of claim 1, wherein:

the sequence of input data received at each circuit block is a time-multiplexed sequence, the vector elements of the output data are outputted as another time-multiplexed sequence.

8. The integrated circuit of claim 1, wherein the digital circuit is configured to:

receive an intermediate sum of squares from a neighboring integrated circuit;

determine, based on the plurality of sums of squares and the received intermediate sum of squares, the first scalar;

receive an intermediate sum from the neighboring integrated circuit; and determine, based on the plurality of sums and the received intermediate sum, the second scalar.

9. A system comprising:

a first crossbar array of memory elements;

a second crossbar array of memory elements;

an integrated circuit including a plurality of circuit blocks and a digital circuit, wherein each circuit block among the plurality of circuit blocks is configured to:

receive a sequence of input data, across a plurality of clock cycles, from the first crossbar array of memory elements, wherein the sequence of input data represents a portion of an input vector, and each input data among the sequence include data elements representing a subset of vector elements in the portion of the input vector;

determine a plurality of sums corresponding to the sequence of input data, wherein each sum among the plurality of sums is a sum of the subset of vector elements in corresponding input data;

determine a plurality of sums of squares corresponding to the sequence of input data, wherein each sum of squares among the plurality of sums of squares is a sum of squares of the subset of vector elements in corresponding input data;

output the plurality of sums and the plurality of sums of squares to the digital circuit;

the digital circuit is configured to:

determine, based on the plurality of sums, a mean of the vector elements in the input vector;

determine, based on the plurality of sums of squares, a first scalar representing an inverse square-root of a variance of the vector elements in the input vector;

determine a second scalar representing a negation of a product of the first scalar and the mean of the vector elements in the input vector;

output the first scalar and the second scalar to the plurality of circuit blocks;

each circuit block among the plurality of circuit blocks is further configured to:

determine, based on the first scalar, the second scalar and the received sequence of input data, vector elements of an output vector, wherein the output vector is a normalization of the input vector; and output the output vector to the second crossbar array of memory elements.

10. The system of claim 9, wherein each circuit block among the plurality of circuit blocks comprises a memory device, and each circuit block among the plurality of circuit blocks is configured to:

store the sequence of input data in the memory device; and retrieve the sequence of input data from the memory device to determine the vector elements of the output vector.

11. The system of claim 10, wherein the memory device is a dual-port static random-access memory (SRAM).

12. The system of claim 9, wherein:

the first crossbar array of memory elements implements a first layer of a neural network; and the second crossbar array of memory elements implements a first layer of a neural network.

13. The system of claim 12, wherein each circuit block among the plurality of circuit blocks is configured to determine a sum of a corresponding input data among the plurality of sums, and a sum of squares of the corresponding input data among the plurality of sums of squares, in parallel.

14. The system of claim 9, wherein the digital circuit is configured to determine the first scalar by using a look-up table.

15. The system of claim 9, wherein:

the sequence of input data received at each circuit block is a time-multiplexed sequence; and the vector elements of the output data are outputted as another time-multiplexed sequence.

16. The system of claim 9, wherein the digital circuit is configured to:

receive an intermediate sum of squares from a neighboring integrated circuit;

determine, based on the plurality of sums of squares and the received intermediate sum of squares, the first scalar;

receive an intermediate sum from the neighboring integrated circuit; and determine, based on the plurality of sums and the received intermediate sum, the second scalar.

17. A method comprising:

receiving a sequence of input data, across a plurality of clock cycles, from a first crossbar array of memory elements, wherein the sequence of input data represents a portion of an input vector, and each input data among the sequence include data elements representing a subset of vector elements in the portion of the input vector;

determining a plurality of sums corresponding to the sequence of input data, wherein each sum among the plurality of sums is a sum of the subset of vector elements in corresponding input data;

determining a plurality of sums of squares corresponding to the sequence of input data, wherein each sum of squares among the plurality of sums of squares is a sum of squares of the subset of vector elements in corresponding input data;

determining, based on the plurality of sums, a mean of the vector elements in the input vector;

determining, based on the plurality of sums of squares, a first scalar representing an inverse square-root of a variance of the vector elements in the input vector;

determining a second scalar representing a negation of a product of the first scalar and the mean of the vector elements in the input vector;

determining, based on the first scalar, the second scalar and the received sequence of input data, vector elements of an output vector, wherein the output vector is a normalization of the input vector; and outputting the output vector to a second crossbar array of memory elements.

18. The method of claim 17, further comprising:

storing the sequence of input data in a memory device; and retrieving the sequence of input data from the memory device to determine the vector elements of the output vector.

19. The method of claim 17, further comprising determining a sum of a corresponding input data among the plurality of sums, and a sum of squares of the corresponding input data among the plurality of sums of squares, in parallel.

20. The method of claim 17, further comprising determining the first scalar by using a look-up table.

* * * * *